United States Patent

Boteler et al.

[11] Patent Number: 4,686,381
[45] Date of Patent: Aug. 11, 1987

[54] OVERHEAD WIRING SYSTEM

[75] Inventors: William C. Boteler, Bridgeport; Alfred L. Ehrenfels, Cheshire, both of Conn.

[73] Assignee: Hubbell Incorporated, Orange, Conn.

[21] Appl. No.: 880,304

[22] Filed: Jun. 30, 1986

[51] Int. Cl.⁴ .............................................. H02G 3/28
[52] U.S. Cl. .................................... 307/147; 307/146; 339/198 GA; 174/48; 174/49; 52/39; 439/450
[58] Field of Search ............................. 307/146, 147; 339/197 R, 198 GA; 52/484, 781, 337, 466, 463, 48, 49, 39; 174/48, 49, 65 SS

[56] References Cited

U.S. PATENT DOCUMENTS

| | | | |
|---|---|---|---|
| 3,074,339 | 1/1963 | Pennati | 52/484 X |
| 3,721,051 | 3/1973 | Fork | 174/49 X |
| 3,835,606 | 9/1974 | Liberman | 52/484 X |
| 4,150,250 | 4/1979 | Lundeberg | 174/65 SS |
| 4,255,611 | 3/1981 | Propst et al. | 174/48 |
| 4,361,992 | 12/1982 | Rapp | 52/484 X |
| 4,481,697 | 11/1984 | Bachle | 174/65 SS X |
| 4,500,796 | 2/1985 | Quin | 307/147 |
| 4,515,991 | 5/1985 | Hutchison | 174/65 SS |
| 4,540,847 | 9/1985 | Gardner | 52/484 X |
| 4,588,853 | 5/1986 | Confer | 174/48 |
| 4,593,506 | 6/1986 | Hartman et al. | 174/48 X |

OTHER PUBLICATIONS

Tash Lighting Considerations by National Electrical Contractors Association 12/77.

Primary Examiner—William M. Shoop, Jr.
Assistant Examiner—Shik Luen Paul Ip
Attorney, Agent, or Firm—Jerry M. Presson; Walter C. Farley

[57] ABSTRACT

An overhead wiring system for use in the suspended ceiling of a clean room includes a generally rectangular housing with closed top, side and end walls and a substantially open bottom. A plurality of movable panels are provided in the bottom to close the bottom wall, one or more of the panels having openings through which a power cord can pass. A barrier within the housing divides its interior into a wiring chamber and a power cord chamber, the wiring chamber having a terminal strip connectable with wires from an external conduit. A power cord is connected to the terminal strip, through the barrier and through one of the panels with a stress-relieving cord grip in each of the pass-through locations. The housing is supporting so as to be substantially coplanar with a suspended ceiling and without exerting stress on the ceiling.

16 Claims, 4 Drawing Figures

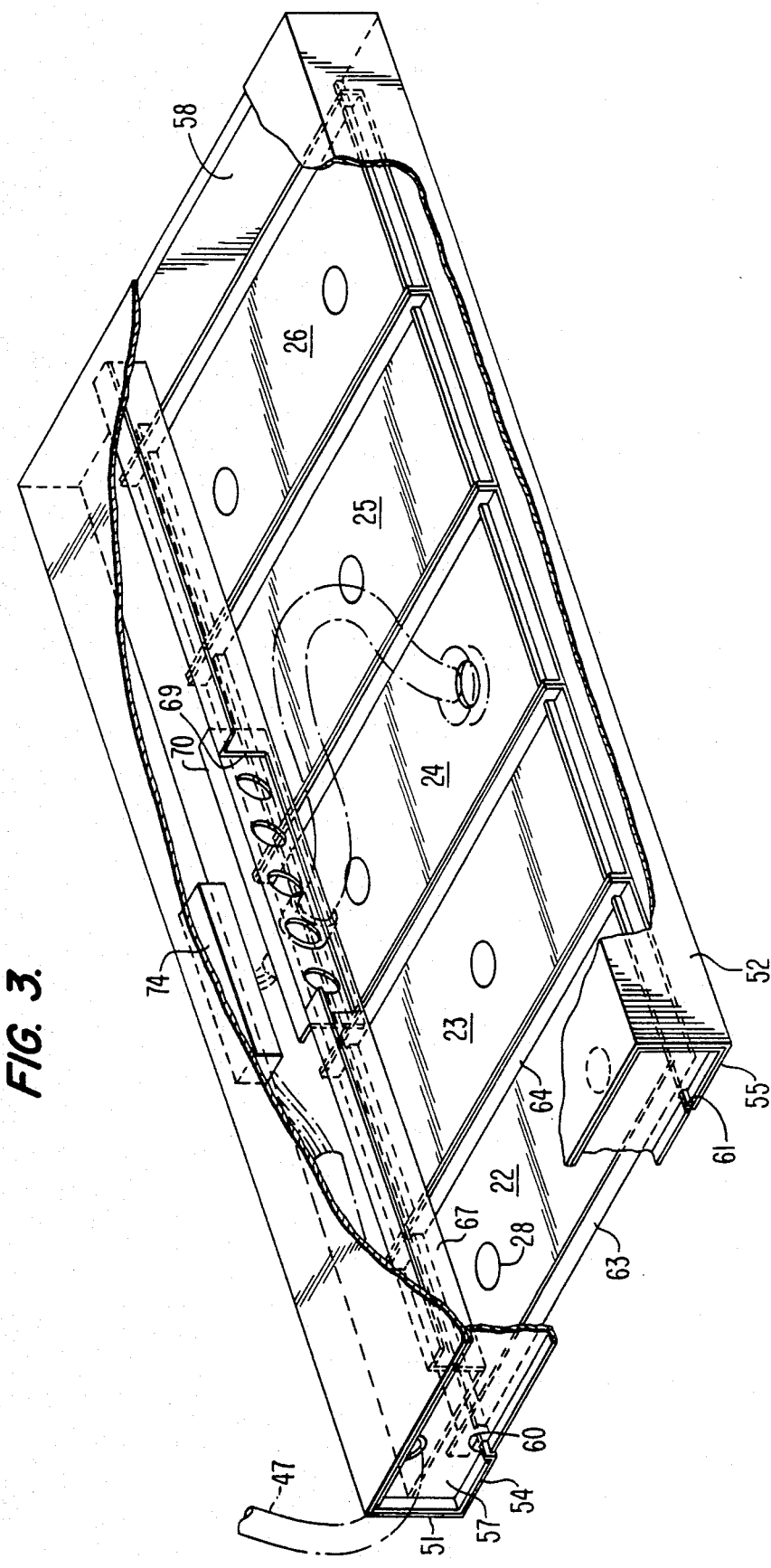

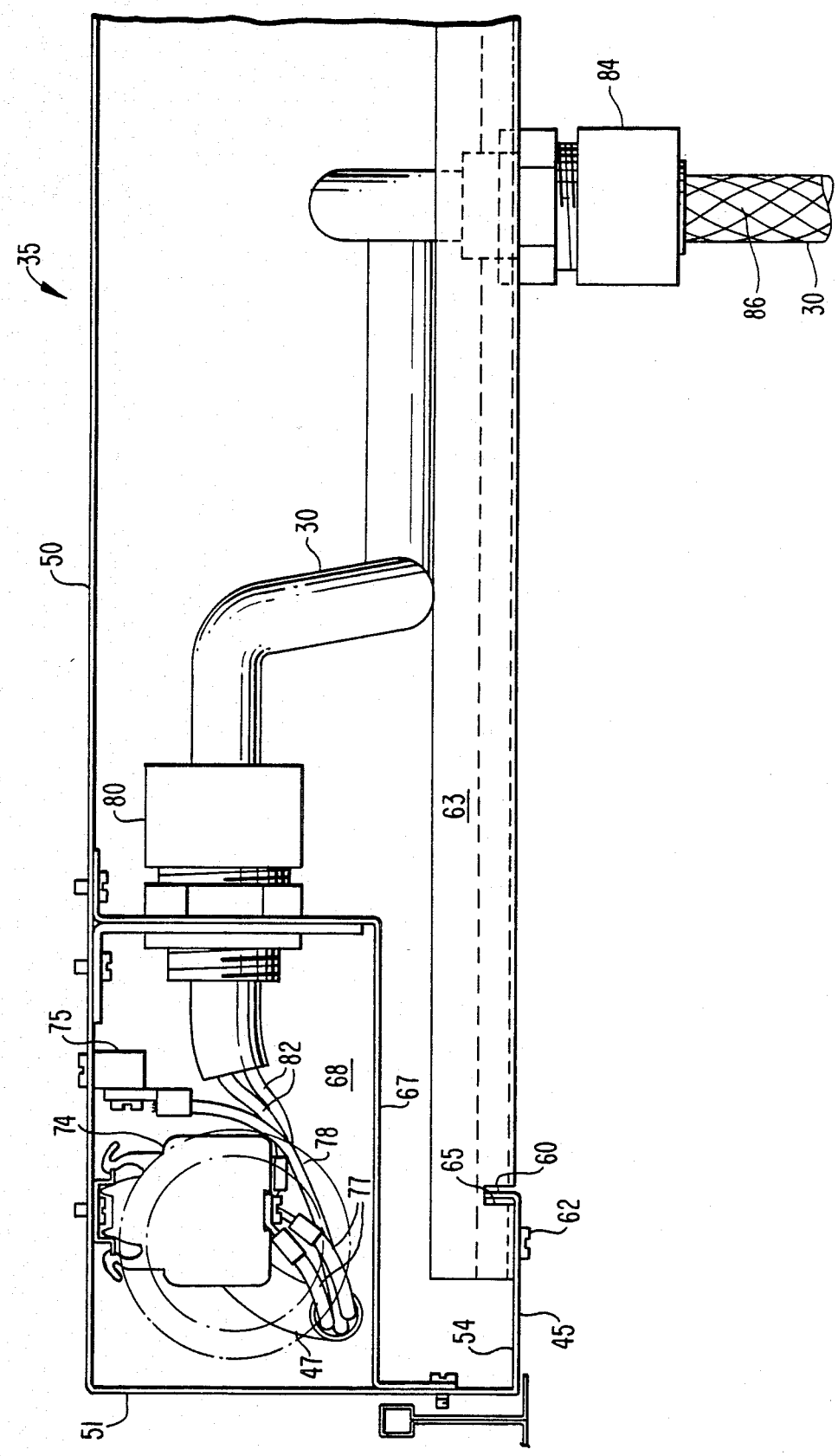

OVERHEAD WIRING SYSTEM

This invention relates to a power supply system for use with a suspended ceiling and, in particular, to an overhead supply box capable of providing power to a specific location within a room.

BACKGROUND OF THE INVENTION

In many industrial and commercial locations it is desirable to supply electrical power from a ceiling rather than from a wall or floor, primarily because arrangements can more easily be changed along the ceiling to accommodate changing location requirements for appliances, instruments or other work machines in the space. Ceiling power supply systems which are particularly intended to accommodate changing conditions include cable reels and sliding contact devices with pendant cords and connectors.

The circumstances which give rise to the need for such a system can be more fully appreciated by considering a manufacturing or food preparation space in which tables with instruments or appliances are arranged in a specific way for a specific product. Power cables or cords can be arranged to depend from junction boxes or other devices attached to the ceiling so that each instrument is connectable to a cord which arrives at the location of the instrument from almost directly above. This is the proper arrangement for various safety and efficiency reasons. It is quite dangerous to have power cords draped across adjacent appliances or instruments because a cord can tip or damage an instrument and also because an appliance involving heating elements can damage a cord. If a new product requires rearrangement of the tables and instruments, the power cords must also be moved, preferably without the need for basic rewiring in the ceiling, particularly where the wiring involves solid conduit. Thus, devices have been developed to try to keep the cords substantially vertical. These includes bus duct arrangements with numerous connecting points as well as cable reels.

However, such devices are not usable in spaces in which cleanliness is a paramount consideration because they inevitably have places which accumulate dirt and from which the dirt can fall into the space when any part of the apparatus is moved. In addition, they are not suitable for use with a suspended ceiling which is desirable, and in some cases essential, for appearance as well as cleanliness. Food service facilities and industrial clean rooms used for the manufacture of items such as semiconductor devices are examples of spaces which have these requirements.

BRIEF SUMMARY OF THE INVENTION

Accordingly, an object of the present invention is to provide a power supply system for use in conjunction with a suspended ceiling which is capable of providing electrical power to locations in a space.

A further object is to provide such a system having a cable housing which can be easily adjusted to change the location from which a power cord depends to accommodate relocation of a utilization device without affecting the wiring of the system and without allowing accumulated dirt to fall into the space.

Yet another object is to provide such a system in which the cable housing is supported independently of the ceiling suspension system.

Briefly described, the invention includes an overhead wiring system for supplying electrical power to a specific location in a space comprising the combination of a generally rectangular housing having top, side and end walls and a substantially open bottom, and a power cord having a connector at one end thereof. A plurality of movable and removable panels form the bottom wall of the housing, at least one of the panels having an opening through which a power cord can pass. The housing includes means for releasably supporting a predetermined number of the panels so that the bottom of the housing is closed, the panels being rearrangeable to position at least one panel at a desired location relative to the housing. A fixed barrier within the housing divides the interior thereof into a wiring chamber and a power cord chamber, the barrier having an opening therethrough for the power cord. At least one of the end walls of the housing has means for admitting supply conduit means into the wiring chamber for delivering power into that chamber, and a terminal block in the wiring chamber has terminals connectable to the wires of the power supply and to wires at the other end of the power cord. Strain relief means are provided in both the barrier opening and in the panel opening for engaging the power cord so that the cord extends from the wiring chamber through the power cord chamber and through the panel and depends to a selected specific location. An arrangement is provided for supporting the housing adjacent the ceiling in the space.

BRIEF DESCRIPTION OF THE DRAWINGS

In order to impart full understanding of the manner in which these other objectives are attained in accordance with the invention, a particularly advantageous embodiment thereof will be described with reference to the accompanying drawings, which form a part of this specification, and wherein:

FIG. 3 is a partially cut away perspective view of the apparatus of FIG. 2; and

FIG. 4 is annlarged sectional view of a portion of the structure of FIG. 2.

DESCRIPTION OF THE PREFERRED EMBODIMENT

Figure 1:
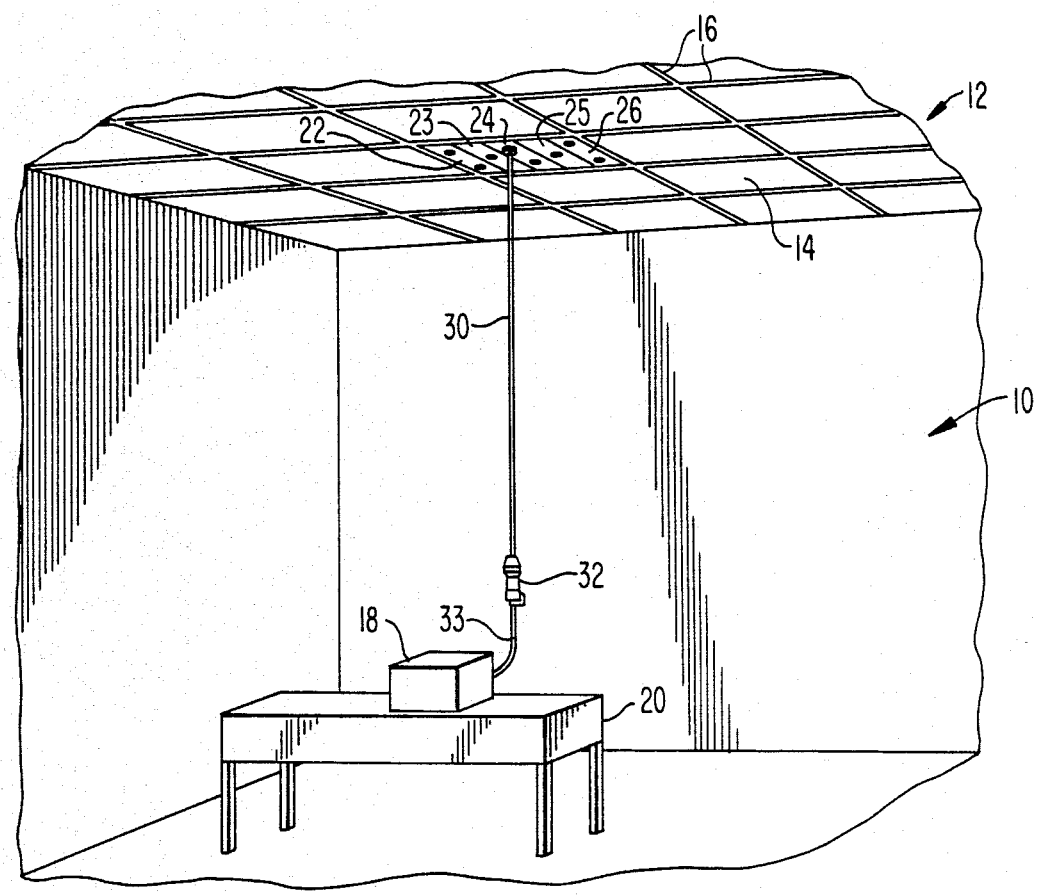
FIG. 1 is a perspective view of a space having power supplied to an apparatus using the wiring system of the present invention.

FIG. 1 illustrates a room indicated generally at 10 having a suspended ceiling 12 with removable panels 14. Ceiling 12 is illustrated as one of a large variety of types of suspended ceilings in which inverted T-shaped trusses or support members 16 are arranged in a grid to support panels 14 which are commonly of a sound-absorbent material.

It will be assumed that room 10 is used as a workspace in which a relatively high degree of cleanliness is required, the room containing appliances or instruments 18 supported on work surfaces 20 in specific locations. For simplicity, only one such appliance is shown, but it will be understood that a room of this type would normally contain a variety of devices, many of which require electrical power.

An apparatus in accordance with the invention is mounted above the suspended ceiling such that a plurality of movable panels 22-26 which have removable knockouts 28 in various locations occupy the region normally occupied by a panel 14. A knockout 28 has been removed from panel 24 and a cable 30 extends through the opening and depends downwardly to a location immediately adjacent appliance 18. At the lower end of cable 30 is a connector device 32 with one or more female receptacles mounted therein to which a power cord 33 from the appliance is connected. With this arrangement, power is supplied to appliance 18 from a location immediately adjacent the appliance and, if the appliance is moved, panel 24 can be interchanged with any of the other panels to position the opening through which cable 30 extends directly above the new appliance position. Commonly, the openings which receive panels 14 are rectangular, having a short dimension of two feet and a long dimension of four feet, although other sizes can be used. This provides considerable flexibility in the positioning of an appliance. Clearly, more than one set of panels can be provided. As will be described, the panels are located in a housing which prevents dirt from reaching the panels themselves so that interchanging the panels with each other does not permit dirt to enter room 10.

Figure 2:
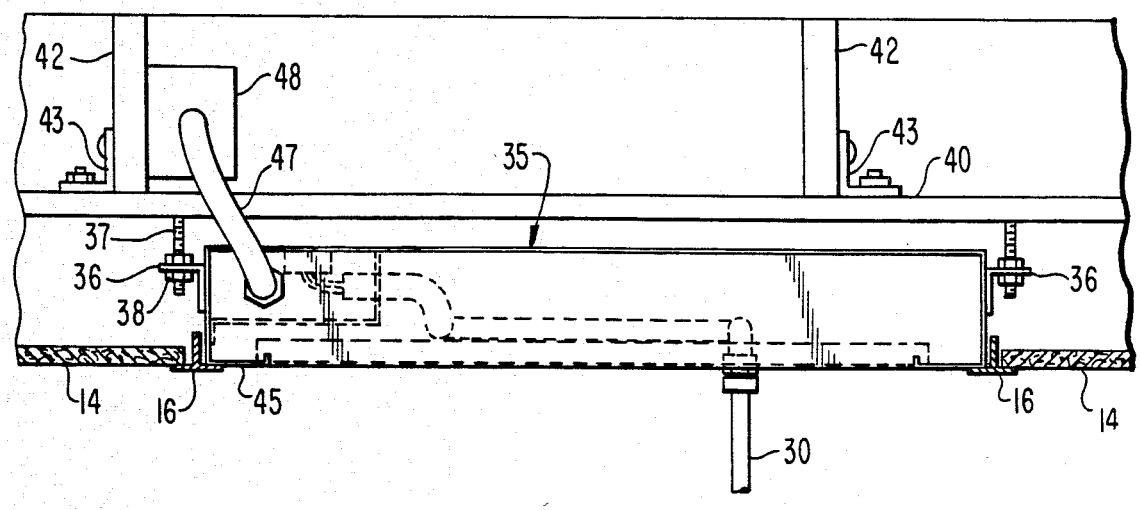
FIG. 2 is a side elevation of the ceiling wiring system in accordance with invention usable in the arrangement of FIG. 1.

FIG. 2 shows an end elevation of the housing and panel structure mounted in a typical ceiling environment. As seen therein, a closed housing 35 is provided with end brackets 36 which are connected to threaded bolts 37 by pairs of nuts 38. Bolts 37 are connected to a transverse support member 40 which is connected to structural beams 42 by any conventional means such as angle brackets 43. The various brackets and connectors used to support brackets 36 are conventionally obtainable, a suitable selection of devices being sold under the trademark UNISTRUT. These devices are used for mounting various electrical and other components in the environment of a commercial building. While the UNISTRUT or other support devices are, in themselves, not a part of the present invention, it is important to note that such devices are used to support housing 35 so that the lower surface 45 thereof is substantially coplanar with the lower surfaces of panels 14 in the ceiling and that the weight of housing 35 is not supported in any significant fashion by T-members 16.

A power cable 47 is used to deliver electrical power to housing 35 and can be a flexible conduit or the like from a junction box such as that indicated at 48. More commonly, conduit 47 would be replaced by a solid conduit leading to housing 35 from a breaker box or the like in the building of which room 10 is a part.

Referring now to FIGS. 3 and 4, it will be seen that the housing comprises an upper surface 50 which is substantially continuous and uninterrupted and also side surfaces 51, 52, these surfaces being sheet metal portions which are unitarily formed with the inwardly extending flanges 54 and 55, the outer surfaces of which form bottom surface 45 of the housing. As seen in FIG. 3, end plates 57 and 58 are appropriately formed and welded or otherwise fixedly attached into place in the ends of the housing to form a continuous, closed, generally rectangular housing the only openings into which are through the bottom which is closed by panels 22–26. As best seen in FIG. 4, flanges 54 and 55 extend inwardly a short distance from their respective side walls and terminate at upwardly extending relatively short walls 60 and 61. Panel 22, for example, is formed as a relatively shallow U-shaped tray with side walls 63 and 64 and open ends. A slot 65 extends across the bottom of each tray to receive wall 60 and a similar slot is provided at the other end of the tray to receive wall 61. Each slot terminates in a notch in side walls 63, 64. The other trays are identically formed so that any individual tray can be lifted up away from walls 60 and 61 and can be slidably moved toward one end or the other of the housing. Each tray is provided with knockouts 28 as previously described which can be removed to permit passage of a cable. Fasteners 62, which can be quarter turn fasteners, are provided to keep the panels from being inadvertently lifted.

Within housing 35 is a barrier 67 which is generally L-shaped and which is attached to side wall 51 and top wall 50. Barrier 67 divides the interior of the housing into a relatively small wiring chamber 68 which is separate from the remainder of the housing which can be thought of as a power cord chamber. The portion of barrier 67 which is perpendicular to top wall 50 is provided with a downwardly extending notch 69. A mounting plate 70 is provided in notch 69, plate 70 having a plurality of knockouts 72 which can be selectively removed to permit the passage of a cable.

Within chamber 68 a terminal strip 74 is mounted on the inner surface of wall 50 and a grounding terminal bar 75 is also mounted to wall 50 in a convenient location.

When housing 35 is initially installed, a determination is made about the number of cables 30 which will be provided and the type of receptacle 32 which is to be attached to the lower end of each such cable. A power conduit 47 is then connected through one of the end walls 57, 58 in a conventional fashion and the individual wires 77 from conduit 47 are connected to conductive terminals on terminal strip 74 and the ground wire 78 is connected to ground terminal 75. The necessary number of cables 30, only one of which is shown, are then connected through openings formed by the removal of one or more knockouts 72 in mounting panel 70, each cable being mounted in its opening 72 by a cord grip 80, the wires 82 from the interior of cable 30 being connected to conductive portions of the terminal strip in a conventional manner so that power supplied by wires 77 is provided to the wires in each cable 30. Each cord grip 80 surrounds its associated cable 30 and engages the exterior of that cable as well as the opening in mounting panel 70 so as to provide a secure mechanical connection between the mounting panel and the cable. The primary function of the cord grip is to provide strain relief so that any longitudinal physical strain on cable 30 from within the power cord chamber does not exert any strain on wires 82 within the wiring chamber. A further function is to provide a barrier against dirt or moisture from the wiring chamber entering the power cord chamber.

A second cord grip 84 is provided on each cable 30 in the opening in the panel through which it passes this being panel 24 in the illustrated embodiment. This second cord grip 84 similarly provides mechanical stress relief so that downward pull on cable 30 is not passed through panel 24 to the interior of the power cord chamber. Cord grip 84 can also be operatively associated with a mesh cable grip 86 surrounding that portion of cable 30 which extends between panel 24 and receptacle 32. Mesh grip 86 can be of the general type shown in U.S. Pat. 3,638,987, formed with either metal or plastic strands, and with the upper ends of the strands fixedly attached, as by welding, into the structure of cord grip 84. As is well known, such grips function by exerting radial gripping forces in response to any effort to elongate the grip. This performs the further function of removing longitudinal stress from the cable itself.

Preferably, when cable 30 is installed, a significant amount of slack is permitted to exist within the power cord chamber so that panel 24 can be interchanged with any other panel in the housing, permitting any cord 30 to be moved to any location in the housing. In order to interchange panel locations, it is necessary only to lift and move the panels. If several panels are provided with power cords, each panel can be lifted, tilted and allowed to pass through the lower opening of the housing, whereupon the cable positions can be interchanged and the panels restored to their positions as the floor of housing 35 in the new locations. This can be accomplished without any rewiring whatsoever, eliminating the need to have an electrician at hand for this purpose. Also, the rearrangement can be accomplished without exposing the interior of room 10 to dirt and the like from above the suspended ceiling because housing 35 is completely closed and dirt is prevented from entering the housing or resting upon the panels therein.

Depending upon the size of the housing, and also the size of mounting plate 70, a plurality of notches 61 (and an equal number of mounting plates) can be provided in barrier 67.

While one advantageous embodiment has been chosen to illustrate the invention, it will be understood by those skilled in the art that various changes and modifications can be made therein without departing from the scope of the invention as defined in the appended claims.

What is claimed is:

1. An overhead wiring system for selectively supplying electrical power to one or more specific locations in a space comprising the combinations of
   a generally rectangular housing having top, side and end walls and a substantially open bottom;
   a power cord having a connector at one end thereof;
   a plurality of movable panels forming a substantially closed bottom wall of said housing, at least one of said panels having an opening through which said power cord can pass;
   means on said housing for releasably supporting a predetermined number of said panels so that the bottom of said housing is substantially closed, said panels being rearrangeable to position said at least one panel at a desired location relative to said housing with said panels again closing said bottom of said housing;
   a barrier within said housing dividing the interior thereof into a wiring chamber and a power cord chamber, said barrier having an opening therethrough for said power cord;
   means in at least one of said walls of said housing for admitting a power cable or conduit into said wiring chamber for delivering power thereto;
   connector means in said wiring chamber for connecting wires in said power cable or conduit to wires at the other end of said power cord;
   strain relief means in one of said barrier opening and said panel opening for engaging said power cord so that said cord extends from said wiring chamber through said power cord chamber and through said panel without exerting strain on said connector means and depends to a specific location; and
   means for supporting said housing.

2. A system according to claim 1 in combination with a suspended ceiling of the type having a generally orthogonal grid of support trusses forming rectangular panel openings wherein
   said housing is dimensioned to fit one of said panel openings, and wherein said means for supporting holds said housing so that the bottom thereof is in the plane of said trusses.

3. A system according to claim 1 wherein said connector means comprises a terminal strip.

4. A system according to claim 1 which includes strain relief means in both said barrier opening and said panel.

5. A system according to claim 4 wherein said barrier is fixedly and substantially immovably attached within said housing.

6. A system according to claim 5 wherein said panels are selectively removable from said bottom of said housing.

7. An overhead wiring system for use with a suspended ceiling of the type having an orthogonal grid of support trusses forming openings into which fixtures or panels can be fitted, the system comprising
   means defining a housing suspended generally above said grid, said housing having a bottom opening and being otherwise substantially closed;
   a plurality of panels dimensioned to be received in said bottom opening, at least one of said panels having an opening therein for permitting passage of a power cord from within said housing;
   a power cord extending from within said housing through said at least one panel to a location below said grid, said power cord having a connector at the distal end thereof; and
   means on said housing for releasably holding said panels so that the positions thereof can be changed to allow relocation of said connector within a space in which said suspended ceiling is installed.

8. An electrical power distribution system for supplying electrical power to work station by means of an electrical drop cord comprising,
   a power distribution unit adapted to be mounted in a location generally overhead of the work station;
   barrier means defining a wiring compartment and a cord storage compartment in said unit, said storage compartment having an open bottom through which the drop cord can egress, the upper end of said cord extending through said storage compartment and extending into said wiring compartment;
   means in said wiring compartment for electrically connecting a source of electrical power to said upper end of said drop cord in said wiring compartment; and
   cover means for closing at least part of the bottom of said cord storage compartment, said cover means having at least one aperture therein through which the lower end of the drop cord can pass and supply pendant power from the overhead location.

9. The system according to claim 8, wherein said cover means is displaceable to provide access to one of said compartments.

10. The system according to claim 9, wherein said cover means is displaceable to provide access to both of the compartments.

11. The system according to claim 8, wherein said means in said wiring compartment comprises a terminal block mounted therein for electrically connecting terminations of said power source to conductor terminations at said upper end of said drop cord.

12. The system according to claim 8 wherein said barrier means includes a barrier plate between said compartments, said barrier plate having at least one opening therein through which said upper end of said drop cord can be passed.

13. The system according to claim 12, wherein said barrier plate has a plurality of openings therein through which a plurality of drop cords can be passed to make electrical connections at said terminal block with said power source.

14. The system according to claim 9, wherein said cover means comprises at least one movable panel having apertures therein at different spaced-apart locations.

15. The system according to claim 14 and further comprising a second panel interchangeable with said at least one panel to provide a multiplicity of cord drop locations relative to the work station while the cord remains in the same aperture in said at least one cover.

16. An overhead electrical power distribution unit comprising, an enclosure having means defining an entry for an electrical power cable and means defining an outlet for a pendant electrical cord;

wall means in said enclosure for dividing the interior of said enclosure into an electrical terminal compartment and a cord storage compartment, respecitvely, said wall means having fastener openings and a passage therein through which one end of said cord may pass and being otherwise substantially continuous and uninterrupted;

a terminal block means mounted in said electrical terminal compartment for electrically coupling said one end of said cord to said electrical power cable;

said cord storage compartment being dimensioned to accumulate excess length of said cord above said outlet; and said means defining said outlet comprising cover means having a plurality of spaced-apart apertures forming said outlet through which said pendant cord may egress and for closing said storage compartment while permitting suspension of said cord from different overhead locations, said cover means being displaceable to permit entry into said enclosure through different locations of said outlet.

* * * * *